June 28, 1932.  H. B. PHILIPS  1,864,613
AUTOMOBILE TRANSMISSION
Filed July 17, 1930   5 Sheets-Sheet 1

INVENTOR
Herman B. Philips
BY
Iris Schumacher
ATTORNEY

June 28, 1932.  H. B. PHILIPS  1,864,613
AUTOMOBILE TRANSMISSION
Filed July 17, 1930   5 Sheets-Sheet 2

INVENTOR
Herman B. Philips
ATTORNEY

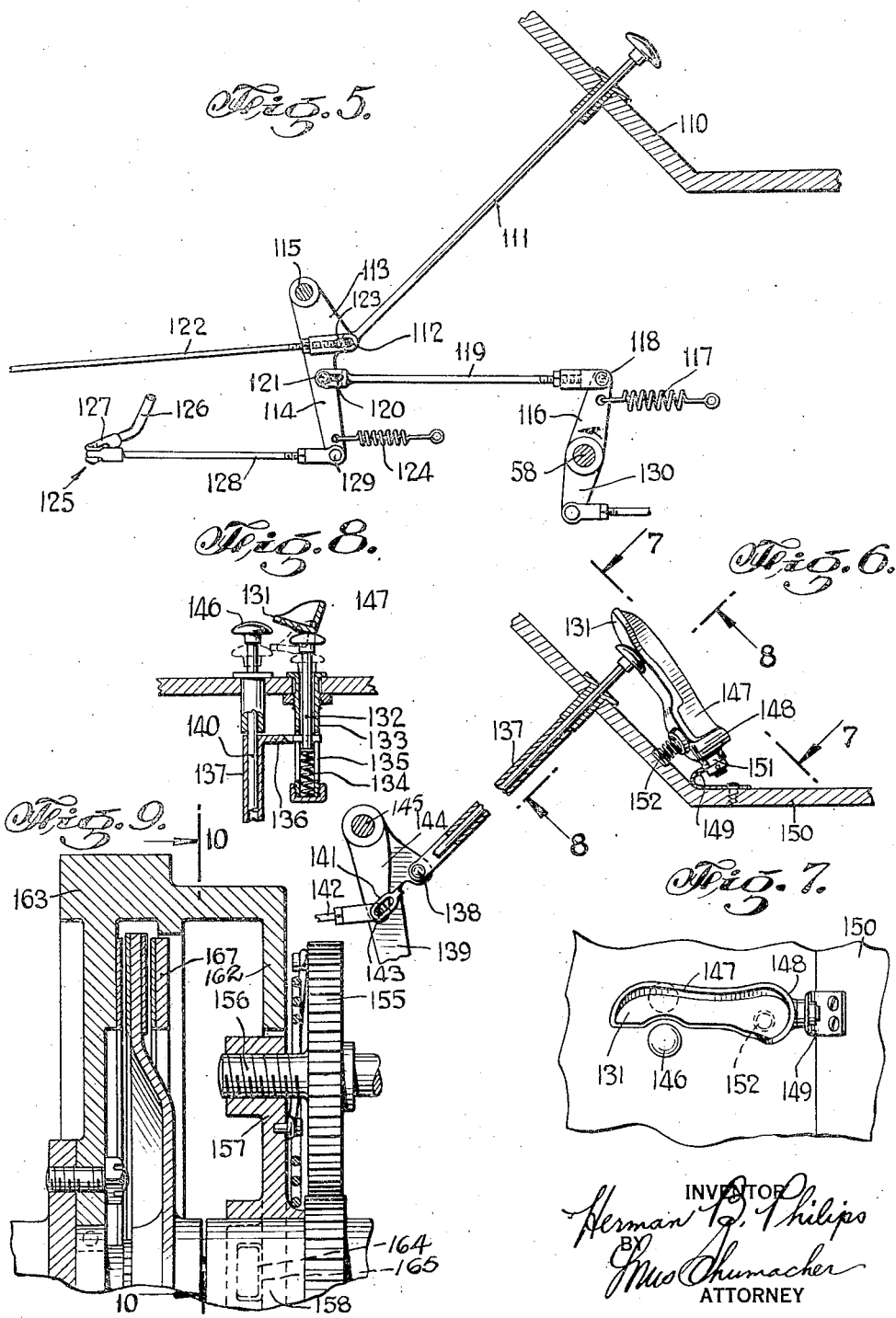

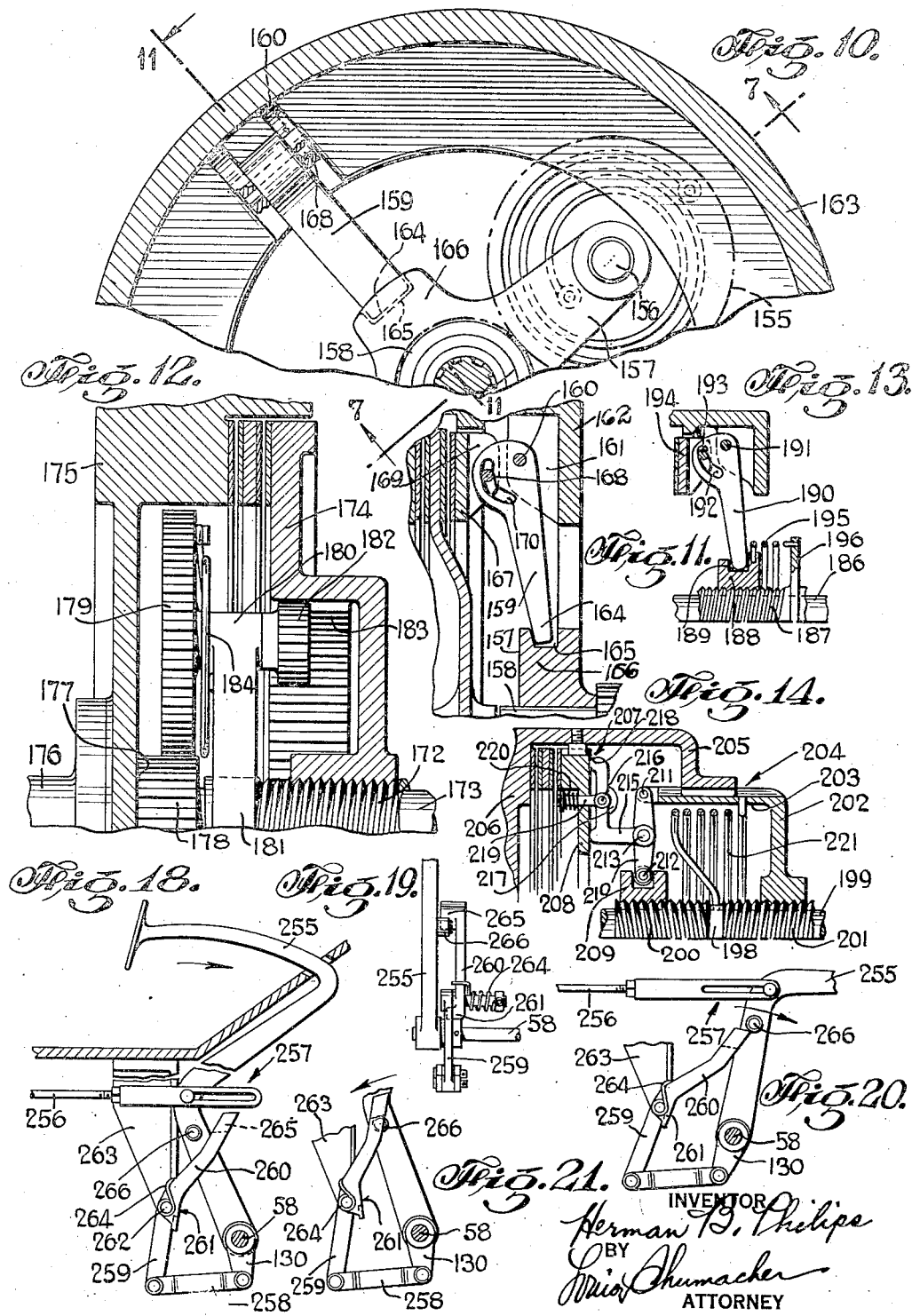

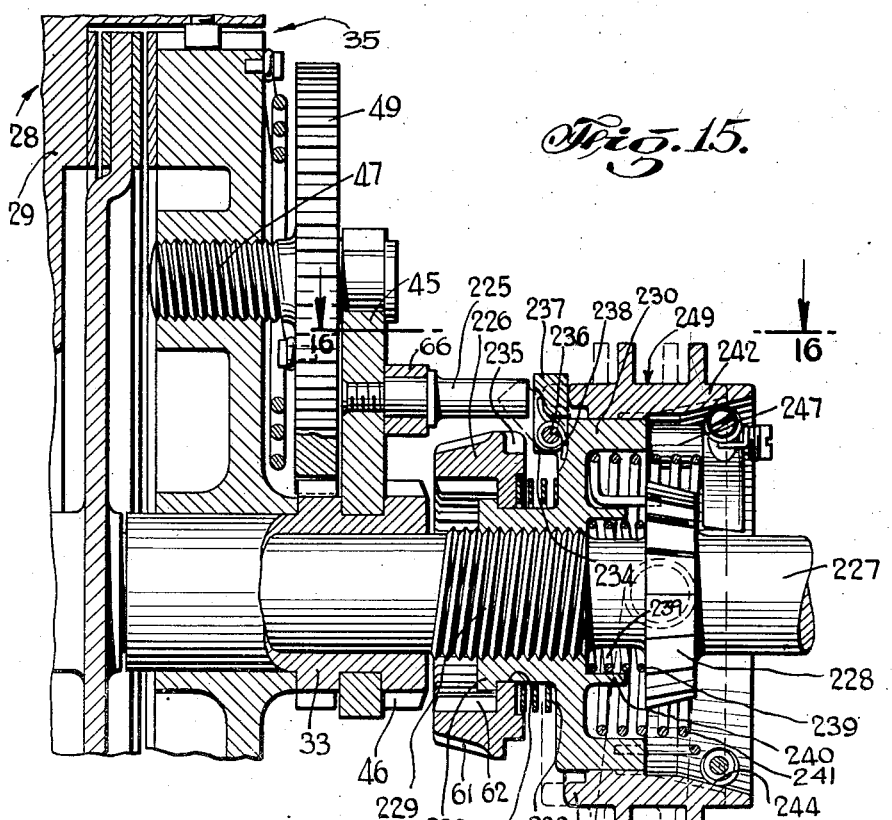
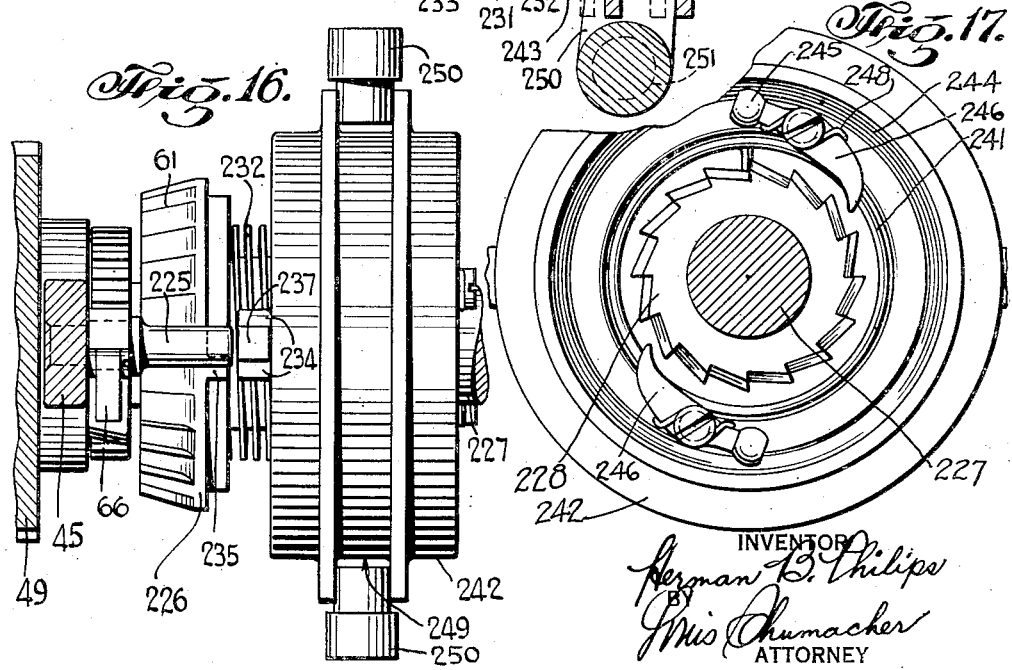

Patented June 28, 1932

1,864,613

UNITED STATES PATENT OFFICE

HERMAN B. PHILIPS, OF NEW YORK, N. Y.

AUTOMOBILE TRANSMISSION

Application filed July 17, 1930. Serial No. 468,596.

This invention relates to transmissions and has particular reference to clutching devices.

One object of the invention is to provide improved means to cause a clutch to engage gradually, or after a suitable time interval, to prevent excessive jarring action.

Another object of this invention is to provide a device of the character described having improved means effective due to a difference in speed of a plurality of rotating members or their associated parts to cause an interengagement of the members for transmission of power from one to the other.

Another object of this invention is the provision of a device of the nature set forth including a clutch and improved means including a threaded device or an equivalent means so constructed that due to a difference in speed of the shafts, the threaded device operates, with a screw engagement to cause the clutch to interconnect said shafts for a transmission of power from one to the other at any required speed relation according to the construction of the clutch.

Another object of the invention is the provision of a clutch for an automobile transmission having driving and driven shafts, and improved means whereby the clutch may remain disengaged to permit the automobile to coast, and whereby the shafts may be interconnected in driving the automobile or in causing the engine to act as a brake, the interconnection occurring due to the difference in speed of the shafts.

Another object of the invention is to provide improved means so constructed as to cause a gradual engagement of the clutch to avoid excessive shock; and a further object is to provide a means of this type which will function in like manner regardless of whether the driving or the driven shaft is running at the higher speed; and another object is to provide means of this character which may be caused to function as a result of a difference in speed of the shafts.

Another important object of the invention is to provide an improved automobile transmission clutch of the class alluded to, the action of which is positive, well regulated and reliable under all conditions, which may comprise relatively few and simple parts, be easy and efficient to operate, and adapted for rugged construction.

Another object of the invention is to furnish an improved resilient means for releasably locking a part of the clutch actuating means to one of the shafts.

A further object of the invention is to construct an improved simplified means for actuating a clutch by a movement in one direction and releasing the clutch by a movement in an opposite direction, regardless of the relative speeds of the shafts to be interconnected by the clutch.

A further object of the invention is to provide improved means to cause the clutch to engage with a speed that varies with the speed of acceleration of the motor.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated on the annexed drawings, wherein like parts are designated by the same reference characters throughout the several views.

In the drawings:

Fig. 5 is a fragmentary diagrammatic view showing a manual means for operating the accelerator, clutch and brake in a required relation.

Fig. 6 shows a pedal operating means for a similar purpose, constructed to operate as a foot rest.

Fig. 7 is a view of the pedal taken on line 7—7 of Fig. 6.

Fig. 8 is a vertical sectional view taken on line 8—8 of Fig. 6.

Fig. 9 is a vertical sectional view of a modified clutch actuating means.

Fig. 10 is a vertical sectional view taken on line 10—10 of Fig. 9.

Fig. 11 is a sectional view taken on line 11—11 of Fig. 10.

Fig. 12 is a fragmentary vertical sectional view of another modification of a clutch actuating means having a gear train.

Fig. 13 is a similar view of a modified clutch actuating mechanism free from gears.

Fig. 14 is a similar view of a modified clutch actuating mechanism with a plurality of screw portions.

Fig. 15 is a vertical sectional view of a modified means for releasably engaging a shaft, after a suitable time interval, with the clutch actuating means.

Fig. 16 is a horizontal view taken on line 16—16 of Fig. 15.

Fig. 17 is a view in side elevation of the same.

Fig. 18 is a view in side elevation of a brake actuating pedal connected to operate the clutch.

Fig. 19 is an edge view thereof.

Fig. 20 is a side view of the same in position to actuate both a brake and clutch.

Fig. 21 is a similar view showing the same returning to initial position.

Figure 1:
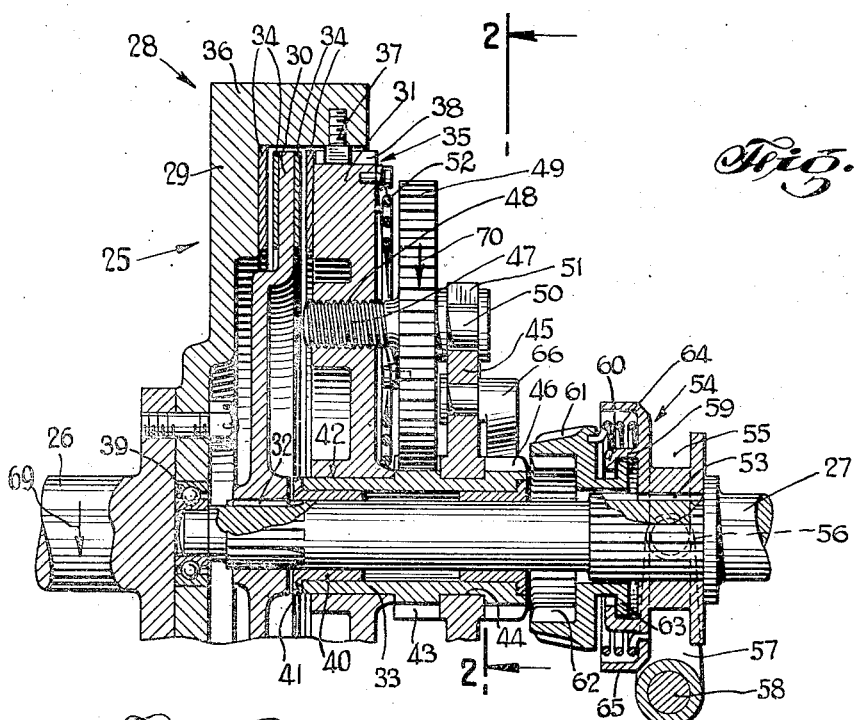
Figure 1 is a fragmentary view in vertical section of a device embodying the invention showing the clutch in idle position.
Figure 2:
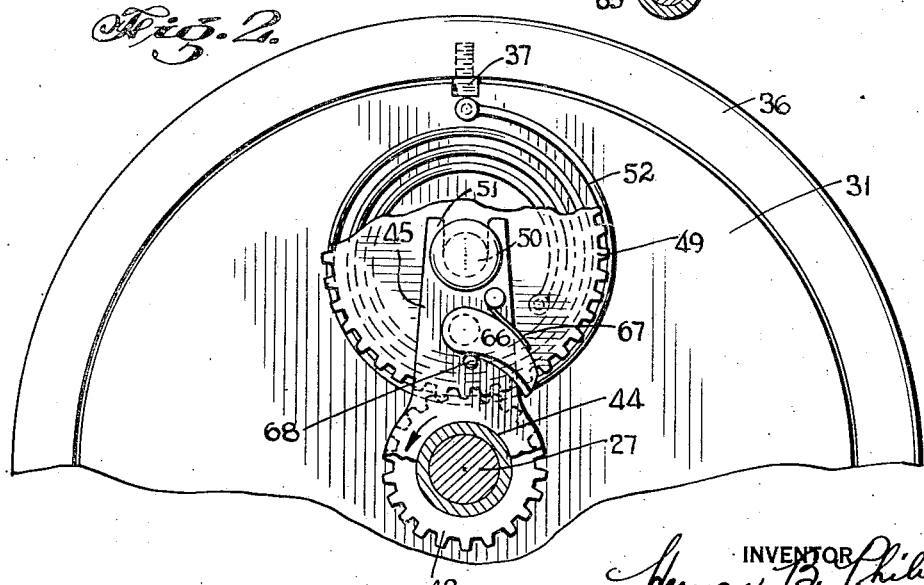
Fig. 2 is a vertical sectional view taken on line 2—2 of Fig. 1.

This invention represents an improvement upon my invention disclosed in U. S. Letters Patent No. 1,713,713, issued May 21st, 1929, and features of this invention, and particularly the means for gradually actuating the clutch are applicable to free wheel clutches.

Generally described, this invention provides a clutch, which can be used for many purposes, and is of especial advantage in automobile transmissions. Among the advantages of the invention is that the engagement of the clutch is gradual, and yet the operation is positive; also that the clutch may be idle as when the automobile is coasting, but the clutch may be efficiently engaged for driving the automobile or for using the motor as a retarding means. Therefore the clutch actuating means employs a screw member which has running engagement with a suitable mating member, the screw member being connected to either the driving or driven shaft, and said mating member to the other shaft, whereby a difference in speed of the shafts causes a relative rotation of the screw member and mating member and axial movement of one of them to actuate the clutch. Consequently one or preferably several of the relative rotations of the members are necessary before the clutch connects the driving and the driven shafts. The actuating means may be releasable from each other or from the shafts, as for example, by making one of said members releasable from its shaft while the other member may be permanently fixed to its shaft. The principle above stated may be used in various modified forms, and while the shafts when interconnected by the clutch may rotate at the same speed, they may also rotate at any predetermined or adjusted relative speeds depending upon the nature of the clutch. Obviously various suitable types of the latter may be employed. In any case the gradual engagement of the clutch is obtained, and such gradual engagement may obtain also when the motor is connected to act as a brake. It will be appreciated that a clutch having yielding friction linings will afford in itself a degree of resilience particularly in view of the gradual engagement mentioned; however, springs or even elastic means may also be employed, and if desired the means for releasably engaging the screw member or mating member with its shaft may be suitably cushioned, or may be constructed to require a time interval for action, or both. While the means mentioned may absorb the force generated when the clutch is operated to connect the motor to act as a brake, this result may also be accomplished by the clutching surface, being either the main or an auxiliary clutching surface. If a considerable time interval be required before the clutch engages, after actuation thereof, a suitable speed reduction means may be employed in co-operation with the screw member to slow down the said relative rotation of the screw and mating members, which speed reduction means may consist of gears, levers, or additional screw members, or any desired combinations of the same. In any case, assuming that the clutch, having been engaged, the actuating means is released, an automatic means operated in any suitable manner coincident with such release, or by any parts effecting the release, or which may consist of a spring, may disengage the clutch by causing a relative rotation of the screw and mating members in the opposite direction. During such time, however, as the clutch is in engagement, a pawl and ratchet wheel means, or the equivalent, may retain the clutch against disengagement, but said means is released together with the actuating means. The utility of a pawl and ratchet wheel is that they will not interfere with the movement of the screw member or mating member. Various arrangements may be employed for the operation of the actuating means in any desired relation with the accelerator, and brake.

Referring in detail to the drawings, 25 denotes a device embodying the invention. The same includes a driving shaft 26, and a driven shaft 27 which may be in alinement. Mounted on the shafts is a substantially conventional disc clutch 28, one element 29 of which may be affixed to the driving shaft, and of the other elements 30, 31, the former may be splined to the driven shaft at 32, while the latter is rotatably mounted on the driven shaft or on a sleeve 33 thereof. The said elements may have frictional facings 34, disposed to engage when the elements are moved toward each other, so as to interconnect said shafts. The clutch element 31 may be splined to the clutch element 29 at 35, or in any other suitable manner. In the arrangement shown, the latter element has a cylindrical flange 36, which extends around the periphery of the other clutch elements, in spaced relation thereto, and a key or pin 37 movable in a transverse slot or keyway 38 in the edge of the clutch element 31. Accordingly, the clutch element 31 is rotatable with the driving shaft, and is movable axially to bear on the intermediate clutch element 30 to move the latter into engagement with the clutch element 29.

The end of the driven shaft may be journaled in a bearing 39, and mounted thereon is any suitable bearing means 40 upon which may be journaled the sleeve 33. To prevent endwise movement of the sleeve, the bearing means may have lips 41 engaging the ends of the sleeve, and said bearing means may also be suitably engaged with the driven shaft in any desired manner to avoid axial movement. Journaled on the sleeve 33 at 42 is the clutch element 31, the latter being axially movable thereon. Adjacent to the portion 42, is a pinion 43 which may be integral with the sleeve. To the right of said pinion is journaled at 44 a supporting member 45, and at the end of the sleeve is a gear 46 which may be integral with the sleeve 33.

Coacting with the clutch element 31 are screw means 47 which may include two or more screws symmetrically disposed about the axis of the clutch and parallel thereto. The screw 47 has a running engagement with a thread 48 formed in the mating or clutch element 31. The said screw may constitute a shaft for a gear 49, the teeth of which mesh with those of the pinion 43. The gear 49 may also have a stub shaft 50 journaled in an open bearing 51 of the supporting member 45. Extending around the screw 47 is a spiral spring 52 secured at one end to the clutch element 31 and at its other end to the gear 49.

Construed in the broad sense, the screw means 47 will be understood to include a cam.

Splined at 53 on driven shaft 27 is an actuator 54, having a circular groove 55 for sliding reciprocation along the shaft by pins 56 of a yoke 57 which is motivated by a rock shaft 58. The said actuator includes a circular flange 59 spaced from the shaft and having a similar, inward extending lip 60. A combination ratchet wheel 61 and concentric internal gear or clutch face 62 are slidingly carried by the actuator, by means of an annular flange 63 engaged by the lip 60. A helical spring 64 is connected at one end to the ratchet wheel 61 and at its other end to the actuator 54. A housing portion 65 may overlie the spring.

The internal clutch face 62 is so constructed that the teeth thereof may mesh with the teeth of gear 46 by a sliding movement toward the left. At that time, a pawl 66 pivotally mounted on the member 45 is engageable with the ratchet teeth 61. This may be actuated by a leaf spring 67 and limited in its movement by a pin 68.

It will be understood that the screw 47, gear 49, pawl 66 and associated parts form one or more units about the shafts, the number of units being determined by the desired distribution of stresses, and other factors.

From the following description of the manner of operation of the device, it will be noted that the rate of speed of the gradual engagement of the clutch may be partially controlled by the speed with which the motor is accelerated.

The operation of the device 25 will now be described. With the driving shaft 26 rotating in the direction of arrow 69, if it be desired to connect the driven shaft 27 thereto to increase the speed of the automobile, the rock shaft 58 is turned to move toward the left the actuator 54 and hence the ratchet wheel and gear 61 62 to engage the pawl 66 and gear 46 respectively. Since the actuator 54 is splined to the driven shaft, the internal clutch face 62 will hold the sleeve 33 against rotation relative to the driven shaft,—at least when the spiral spring 64 is under sufficient tension, it being noted that this spring renders the interlock with the sleeve 33 resilient rotatively. Since the clutch element 31 rotates with clutch element 29 due to the spline 35, the gear 49 travels around the pinion 43, and forms therewith a planetary system. Hence the gear 49 not only revolves around the pinion 43 but also rotates as shown by arrow 70 causing the screw 47 to move the clutch element 31 toward the left, whereupon the clutch 28 engages to interconnect the driving and driven shafts to rotate at the same speed, that is, the speed of the driven shaft is increased to that of the driving shaft. Thus this operation of the clutch actuating means, including pinion 43, gear 49 and screw 47, is due to the initial difference in the speeds of the driving and driven shafts. While this operation of the said clutch actuating means occurs, the pawl 66 rides freely over the teeth of the ratchet wheel 61, and prevents accidental reverse movement of said actuating means. When the clutch 28 is to be released, the rock shaft is moved in reverse direction, moving the ratchet wheel 61 and clutch face 62 toward the right to release the sleeve 33 from the driven shaft, whereupon the spring 52 which was tensioned by the clutch actuating operation, is free to turn the gear 49 and hence the screw 47 in reverse direction, causing the clutch element 31 to move toward the right and open the clutch. The spring will also tend to retain the clutch in open position. If while the automobile is coasting, it is desired to engage the clutch to cause the motor to be used as a brake, the actuating means is interengaged as hereinbefore described, whereupon the pawl 66 operates with ratchet wheel 61 to cause a direct connection, which is nevertheless resilient due to the spring 64.

Figure 3:
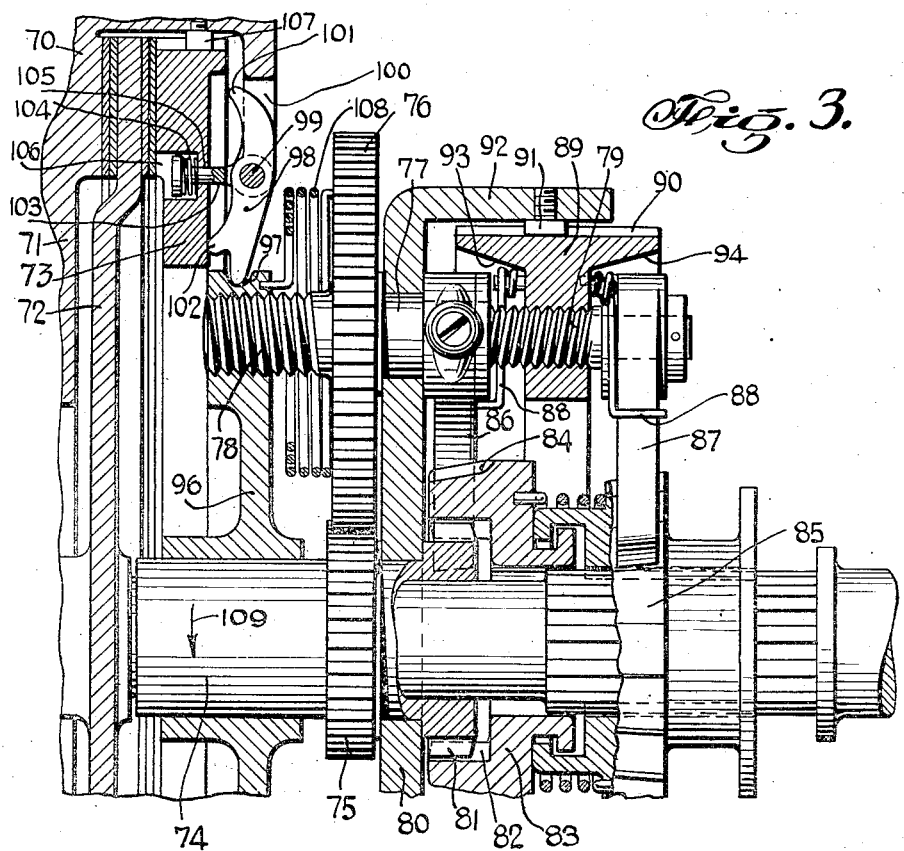
Fig. 3 is an enlarged fragmentary view, with parts in section, of a modified means for releasably locking one of the shafts with the clutch actuating mechanism.
Figure 4:
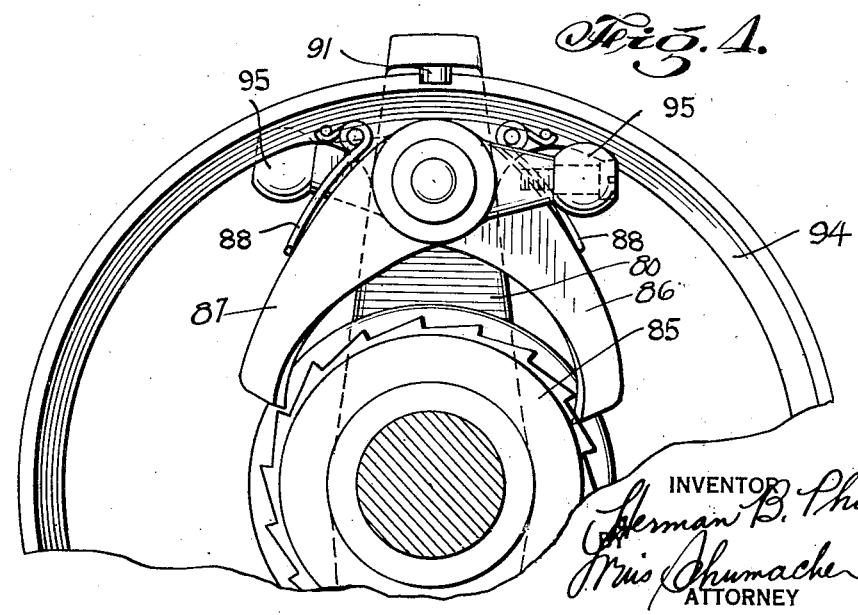
Fig. 4 is a view in side elevation thereof.

In Figs. 3 and 4 is shown a modification of the invention wherein the action of the clutch is available not only in driving the automobile from the motor, as hereinbefore described, but also where the motor is utilized as a brake, in which latter case, the clutch serves to cushion the engagement. Reliance upon a spring 64 for this purpose is thus avoided. According to this modification, clutch 70 has an element 71 mounted on the driving shaft, an intermediate element 72 splined on the driven shaft, and an element 73 journaled on a sleeve 74 which is mounted on the driven shaft, as hereinbefore described. Said sleeve includes a pinion 75 the teeth of which mesh with those of a gear 76 having a shaft 77 including integral screws 78, 79 having right hand and left hand threads respectively. Said shaft 77 is journaled in a supporting member 80 that is journaled on the sleeve 74. Also formed on the sleeve is a gear 81, the teeth of which are adapted to mesh with those of a relatively sliding internal gear or clutch face 82 formed on a hub 83 that is journaled on an actuator such as 54, shown in Fig. 1, which is similarly mounted and splined to the driven shaft and actuated in a like manner by means of a yoke 57 and rock shaft 58.

Formed on the hub 83 are a plurality of spaced ratchet wheels 84, 85, the teeth of which extend in opposite directions to mesh with their respective oppositely extending pawls 86, 87. The latter are journaled on portions of the shaft 77, and are actuated toward the ratchet wheels by springs 88 or the like. Threaded on the screw 79 is a runner 89 which may be in the form of an annulus to similarly engage other screws 79 that may be symmetrically engaged around the device. The runner 89 has a keyway 90 to slidingly receive a pin or key 91 extending from a flange 92 of the supporting member 80. Formed on the interior face of the runner 89 are a plurality of cam faces 93, 94 for engagement with the followers 95 of the pawls.

Having threaded running engagement with screw 78 is an annulus 96 slidingly journaled on the sleeve 74. This annulus is provided with one or more bearing portions or recesses 97 for pivotal engagement with a lever 98. The latter is pivotally mounted at 99 on a flange 100 extending inward from the clutch element 71 that is mounted on the driving shaft. Formed at the ends of the lever are equal fingers 101, 102 both of which are equally spaced from the axis 99 and extend in the same general direction to abut the side of clutch element 73. Connected to the pivot 99 is a tension rod 103, with which coacts an expansion coil spring 104 to tend to move clutch element 73 toward the lever 98. For this purpose, the rod may extend through an opening 105 in the said element, while the spring 104 is housed in a recess 106 of said clutch element and in engagement with the rod 103. The clutch elements 71 and 73 may be splined together at 107. A spiral coil spring 108 is connected at the ends thereof to the annulus 96 and the gear 76 to function in the manner of spring 52. By this modification, therefore, the clutch is closed regardless of whether the driving or driven shaft is rotating at superior speed, and the pawl arrangement is effective to automatically prevent release of the clutch in either case. Obviously, various changes and substitution of mechanical equivalents may be made within the scope of this invention.

The operation of the modification shown in Figs. 3 and 4 will now be described. When the clutch is to be engaged, the actuator 54, as in Fig. 1, is moved toward the left, whereupon the internal clutch member 82 is engaged with gear 81 of the sleeve 74, locking the latter to the driven shaft. Simultaneously ratchet wheels 84, 85 are brought into alinement with their corresponding pawls 86 and 87. With the sleeve locked, pinion 75 is stationary relative to the driven shaft, whereby the difference in speed as between the driving and driven shafts, causes screw 78 to turn with respect to its mating member 96. Assume that the direction of rotation of the shafts is as indicated by arrow 109. Now if the driving shaft rotates more rapidly than the driven shaft, the screw 78 will cause its mating member 96 to move toward the left; and when the driven shaft rotates more rapidly than the driving shaft, the relative direction of rotation of the screw 78 is reversed and member 96 is moved toward the right. In the first case, the finger 102 moves the clutch element 73 toward the left, and in the second case, finger 101 moves the clutch element 73 toward the left. In either case, therefore, the clutch is caused to engage. Simultaneously, the cam member 89 is moved by screw 79 in any desired direction and generally opposite to the member 96. Now, when the cam member 89 moves toward the left, pawl 86 is moved thereby out of engagement with its ratchet wheel 84 by the cam surface 93, while pawl 87 engages its ratchet wheel 85; and this action occurs with the driven shaft overrunning the driving shaft. But when the driving shaft rotates at the higher speed, the cam member 89 moves toward the right, and causes the pawl 87 to assume an idle position while pawl 86 is released into engagement with the ratchet wheel 84. Thus in both cases the pawl and ratchet wheel structure is operative to prevent disengagement of the clutch, and such disengagement can be effected only by moving the actuator 54 toward the right to unlock sleeve 74, whereupon the spring 108 returns the screw 78 to neutral position, moving clutch member 73 toward the right, and opening the clutch.

It will be thus seen that this invention includes means for locking the clutch in engagement when the motor is used as a brake so that the automobile cannot run ahead of the motor; and further that the locking means is adequately and efficiently cushioned.

In Fig. 5 is shown a device for operating either of the structures hereinbefore described, or disclosed hereinafter. It will be noted that any suitable means may be employed for this purpose, and that, generally, it is desirable to actuate the clutch first and the accelerator subsequently, and after a suitable, relatively small time interval. 110 may denote a dashboard through which extends an accelerator pedal bar 111, which is pivotally connected at 112 to an arm 113 of a lever 114 that is pivoted at 115. An arm 116 is connected to the rock shaft 58 and retained in desired position by a spring 117, as for the purpose of keeping the clutch open. Pivotally connected at 118 to the arm 116 is a link 119 having a slot 120 receiving a pin 121 of the lever 114. The said pin is at that end of the slot, that upon moving the accelerator pedal downward the clutch means is immediately actuated, and after a suitable time interval, the rod 122 which operates the fuel supply. The lapse of this time interval is due to the slot 123 which engages the pin 112. A spring 124 will tend to return the parts to initial position. The lever 114 may be actuated also by a hand control 125 including a rod 126 extending to the steering wheel (not shown), a knuckle joint 127, and rod 128 connected to the lever at 129. At 130 may be provided an arm which is connected to the brake pedal as hereinafter described, and whereby the clutch and brake may be operated substantially simultaneously and yet without actuating the accelerator, because of the slot 120, providing lost motion.

In Figs. 6 to 8 is shown an arrangement including a foot pedal so constructed as to form a comfortable foot rest, the foot resting on its outer portion with the toes somewhat elevated when it is not desired to engage the clutch or accelerate the motor. This foot rest must be depressed in the front toe portion before it is possible to accelerate the motor, which depression will first actuate the clutch and accelerate the motor slightly before the clutch engagement is concluded; the foot returning to a restful position on the foot rest when the motor acceleration is no longer desired. To this end, a foot rest 131 is provided to depress the bar 132, the latter being slidable in a tubular housing 133, the lower end whereof is closed to support an expansion coil spring 134 therein which tends to move rod 132 upward. Said tubular housing is slotted at 135 to receive an arm 136 of a tube 137 which is pivotally connected at 138 to a lever 139 that is similar to lever 114. Extending through the tube 137 is a rod 140 which has lost motion connection at 141 with an accelerator rod 142 by means of a pin 143 that is mounted on an arm 144 pivoted on the pivot 145 of the lever 139. At the upper end of the rod 140 is a head 146 disposed laterally and in relative proximity to the pedal 131.

The pedal 131 which may be of any suitable type, preferably includes side and end flanges 147, 148. It may be disposed at an angle with the horizontal transversely thereof, as shown, to support the foot in correct orthopedic position. The mounting for the pedal may permit a universal movement thereof. One embodiment for accomplishing this result may consist in the provision of a leaf spring 149 that is secured to a floor 150 and carries a bearing 151 to support the pedal for transverse tilting while permitting the toe of the pedal to be depressed and returned by the spring 149. To retain the pedal at an angle in the transverse direction, an expansion spring 152 is provided off center with respect to the axis of the bearing 151 and toward the inner side of the pedal.

The operation of the device shown in Figs. 6 to 8 will now be described. With the operator's foot resting comfortably on the foot rest, if the speed of the motor is to be increased, the toe portion of the foot rest is depressed, causing the sleeve on the driven shaft to be engaged and initiating the throwing of the clutch. Then the head 146 of the accelerator is depressed and the motor accelerated. It will be noted that the acceleration is timed to occur after the engagement of the clutch has begun, whereby such engagement may be readily accomplished and with minimum wear. Furthermore, the acceleration may be completed before the clutch has been fully engaged, preventing any possibility of stalling of the motor, and this result directly follows from the gradual engagement of the clutch as provided for by this invention. It will be noted, also, that the foot rest may be moved angularly transversely about the pivot 151 to variably actuate the accelerator in relation to the clutch, or in fixed relation.

In Figs. 9 to 11 is shown a modification of the invention wherein various novel principles are illustrated among which may be mentioned the following: First, the gradual engagement of the clutch afforded by the employment of a screw and gear train may be rendered still slower by the utilization of a lever in the combination; and, secondly, a direct and simple cam means may be used to cause the clutch to engage whether the driving or driven shaft rotates at the higher speed. Otherwise, this modification is generally similar in construction to that hereinbefore described, and it will be particularly noted that the clutch actuating means, including the pawl and ratchet structure of Fig. 3 may be used therewith, or that of Fig. 1 if the cam means be omitted and a simple pivotal connection substituted.

According to this modification of Figs. 9 to 11, the gear 155 rotates the screw 156 which is threaded into a sliding member 157 that is journaled on the sleeve 158 on the driven shaft. Set at an angle of 90 degrees with respect to the screw 156 is a lever 159 which is pivotally connected at 160 to a web 161 of a flange 162, the latter extending inward from a clutch element 163 that is mounted on the driving shaft. The said lever extends generally toward the axis of the clutch, and has a free end 164 pivotally engaged in a recess 165 formed in a portion 166 of the slidable member 157. Said lever 159 also has pivotal engagement with a clutch element 167, and this engagement may consist of any suitable type, as, for instance, including a pin 168 on a web 169 of the clutch element 167, and a cam slot 170. The latter may be so formed with respect to the pivot 160 that, whether member 157 moves toward the right or toward the left, the clutch will nevertheless be caused to be engaged for interconnecting the driving and driven shafts. With this structure, the pawl and ratchet wheel arrangement of Fig. 3 may be used. However, if the curve of the cam slot 170 be such as to cause the clutch to engage only with the driving shaft running faster than the driven shaft, then the pawl and ratchet wheel of Fig. 1 may be used. It will be appreciated that the screw 156, lever 159 and associated parts constitute a unit, and that any number of units may be employed to actuate the clutch.

In Fig. 12 is shown another modification of the invention wherein a screw may be used, which is disposed directly on either one of the driving or driven shafts; and wherein a gear train including more than two gears may be used for a slow and gradual actuation of the clutch. Thus sleeve 172 on driven shaft 173 may have threaded engagement with a circular plate 174 constituting one of the clutch elements. Another of the clutch elements is denoted by 175 and is affixed to the driving shaft 176. Connected at 177 in concentric relation to the latter is a pinion 178, the teeth of which mesh with those of a gear 179 journaled on a bearing 180 of a member 181 that is journaled on said sleeve. Connected to rotate with said gear 179 is a pinion 182 which engages an internal gear 183 formed on the plate 174. A spiral spring 184 is connected at its ends to the gear 179 and to the member 181. It will be clear that if sleeve 172 is locked to the driven shaft 173, as by the means shown in Fig. 1, the pinion 178 rotating with the driving shaft and clutch element 175 will cause rotation of gear 179 and hence of pinion 182 and the internal gear 183, whereby the plate 174 will move along the thread 172 to the engaged position of the clutch. It may be noted that the clutch elements 174, 175 will rotate in opposite directions, but the clutch element 174 will rotate more slowly than the driving shaft so that the desired slow engagement of the clutch is assured. It will also be appreciated that since the gear 179 revolves around the pinion 178 in the direction of rotation of the latter, that the speed of rotation of the gear 179 is reduced.

The clutch element intermediate the elements 174, 175, may be omitted or may constitute an idler that may be gripped between the elements 174, 175.

In Fig. 13 is shown another modification of the invention wherein a lever is directly actuated by a screw. Thus a driven shaft 186 has a sleeve 187 journaled thereon and adapted to be locked thereto by a means hereinbefore described. Said sleeve has threaded engagement with a collar 188, recessed at 189 to pivotally receive a portion of a lever 190 and prevent relative rotation between the collar and the lever. The latter is disposed to operate in the manner of lever 159, being pivoted at 191 and having cam engagement at 192 with a pin 193 of clutch element 194. A spiral spring 195 interconnects the collar 188 with a disc portion 196 of the collar. The cam may be so formed as to cause the clutch to close when the pin 193 is at either end of the same, in which case means as shown in Fig. 3 may be used to lock the sleeve to the driven shaft. But if the engagement at 192, 193 be such as to cause the clutch to engage only when the driving shaft rotates at higher speed than the driven shaft, then the means shown in Fig. 1 is used to lock the sleeve to its shaft.

In Fig. 14 is shown another modification of the invention including a plurality of screws one of which may be right hand and the other left hand, and these screws being of different pitch whereby the clutch actuating means functions at a speed in proportion to the difference in pitch of the screws. According to this modification a sleeve 198 is journaled on a shaft 199, this sleeve having oppositely threaded portions 200, 201, the pitch of one of the threads, for instance 200, being greater than that of the other. Having screw connection with the threaded portion 201 is a cylindrical member 202, the circular wall 203 of which may be provided with a splined connection at 204 with a similar wall 205. The latter may constitute an extension of clutch element 206 that has a splined connection at 207 with clutch element 208. Having screw engagement with the portion 200 is a collar 209. A lever 210 is pivotally connected at its opposite ends 211, 212 to the wall 203 and to the collar 209 respectively. Pivotally coacting with the lever 210 at 213 is a bell crank lever 215 which is pivotally mounted at 216 on a hub 217 extending from the member 205. Projecting from an arm of the bell crank lever are follower portions 218 which are on opposite sides of the pivot 216, from which a link 219 extends, and is provided with an expansion coil spring 220 which tends to move the element and the lever toward each other. It will now be apparent that, in operation, regardless of whether the driving or the driven shaft runs at higher speed, the clutch will be engaged, so that in one case the speed of the automobile is increased and in the other case, the motor is used as a brake. But this engagement of the clutch will proceed slowly and in accordance with the difference in pitch of the screws 200, 201, as well as the difference in speed of said shafts. When the sleeve 198 is released from the driven shaft, the coil spring 221 tends to return the device to neutral position with respect to the screws and to open the clutch.

In Figs. 15 to 17 is shown a modified means of locking a sleeve to a shaft, and specifically to cause the locking engagement to occur after the lapse of a suitable time interval. This modification is directly applicable to the structure shown in Fig. 1 and also to that shown in Fig. 3, but the principle may be amply illustrated in connection with the former. In fact, the clutch and actuating mechanism therefor may be exactly as shown in Fig. 1, with only the following exceptions, that the stub shaft for the pawl 66 may have an extension 225, and the primary member 226 having the internal gear 62 and ratchet wheel 61 may be of slightly different construction.

The driven shaft is denoted by 227, and it may include a ratchet wheel 228 affixed thereto and a screw portion 229 spaced from the ratchet wheel. Having threaded running engagement with the screw portion, is an intermediate circular member 230, the same having a seat 231 upon which the primary member 226 is journaled for axially sliding as well as rotary motion. A spiral spring 232 is disposed around the circular seat to tend to move the primary member to an end of the intermediate member and toward the clutch 28, until stopped by a lip 233. Formed on the intermediate member near the periphery thereof is a lug 234 which is disposed to engage a projection 235 of the primary member, when the latter and the intermediate members are moved toward each other as hereinafter described. Pivotally connected to said lug at 236 is a bolt 237 retained in position by a spring 238, but adapted to be moved into the dotted line position to engage the member 225, as hereinafter set forth. Upon the right hand side of the intermediate member is an expansion coil spring 239 which acts as a cushioning means between the ratchet wheel and intermediate member. This cushion spring is partially enclosed by a circular flange 240, and disposed around the latter is a coil spring 241, one end of which is secured to the ratchet wheel which is stationary on the shaft 227, and the other end of which is secured to the intermediate member 230. Journaled upon the intermediate member 230, is a secondary member 242, which includes a circular bearing portion 243 to actuate the bolt 237. On the opposite side of the secondary member may be provided an integral circular cam 244 which may engage heads 245 of pawls 246 that are mounted on hubs 247 projecting from the intermediate member 230. Springs 248 may tend to actuate the pawls inward toward the ratchet wheel 228, with which, in this position, they are out of alinement. The outer surface of the secondary member 242 is grooved at 249 for engagement by a yoke 250 that may be operated by a rock shaft 251.

The operation of the device shown in Figs. 15 to 17 will now be described. To lock the sleeve 33 to the driven shaft, the secondary member 242 is moved toward the left by means of the yoke, moving the bolt 237 into the path of the extension 225. Assuming that the driving shaft is rotating faster than the driven shaft, the extension 225 which revolves due to the rotation of the clutch and its associated mechanism with the driving shaft, will cause the intermediate member to rotate. This rotation of the latter, due to the screw 229, will cause the intermediate member 230 to move toward the left and actuate the primary member 226 into engagement with the gear 46, and its ratchet wheel 61 into alinement with pawl 66. As the rotation of the intermediate member relative to the screw continues, the spring 232 is compressed, so that eventually the lug 234 engages the projection 235. When this is substantially consummated, pawls 246 come into alinement with ratchet wheel 228, and engage with the latter to prevent accidental reverse rotation and release of the primary and intermediate sleeve locking members. The operation of the pawls is caused by the cam 244, which releases the heads 245 of the pawls and permits the latter to engage the ratchet wheel under actuation of their springs. The engagement of the lug 234 with the projection 235 is an operation that is facilitated because it occurs preferably when the clutch is beginning to engage, so that there is little or no relative rotation therebetween. The sleeve 33 is now fully locked to the driven shaft, and this has occurred after the lapse of a certain period of time since the locking operation was initiated.

The locking action described occurs smoothly and accurately, flexibility in engagement being also provided for by the various springs, as, for instance, spring 232 which permit the clutch teeth 46 and 62 to suitably engage.

Assuming that the driven shaft 227 is rotating at higher speed than the driving shaft, the intermediate member 230 will be caused by the screw 229 to move in an opposite direction or toward the right, in which case the spring 239 will act as a cushion. The bolt 237 will engage the extension 225 in the same manner as hereinbefore described, but in an opposite direction, and interconnect with the driving shaft through the intermediacy of the parts associated with the clutch, although the clutch itself will remain open. The parts referred to may include member 45, spline 35 and the clutch element 29, but the primary member 226 will remain inoperative. Thus the motor may be connected to the driven shaft to act as a brake, and obviously no great amount of torque will be thus transmitted. Nevertheless, a plurality of the bolts 237 and of the extensions 225 may be used as a plurality of units disposed in angularly spaced relation, and they may also be increased in weight and strength within the scope of the principle disclosed.

The secondary member 242 will remain in its position at the right, and retain the pawls 246 in inoperative position. When the secondary member 242 is released, the spring 241 returns the intermediate member to initial position, and the bolt 237 releases the extension 225.

In Figs. 18 to 21 is shown a modified control, including a brake pedal connection for the clutch whereby operation may be obtained of the clutch alone, or of both the clutch and brake together, or of the brake alone, in consecutive operation. This modified control may be interconnected with the control shown in Fig. 5. Thus the control shown includes a pedal 255 journaled on the rock shaft and actuating a brake rod 256 by means of a lost motion connection 257. Fixedly connected to the rock shaft 58 is the arm 130 also shown in Fig. 5, to which is connected a link 258 and an arm 259 of a lever 260, with which it has what may be termed a rule joint connection 261, pivoted at 262 on a bracket 263. Tending to maintain a stiff joint at 261 is a spring 264. Formed on the upper free end of the lever 260 is a head 265 which is disposed in the path of a roller 266 in the brake pedal lever.

In operation, as the brake pedal is moved forward, the roller 266 abuts the head 265 and swings the lever 260 to actuate the rock shaft 58 and cause the clutch to engage. During this initial movement, the connection 257 may be in operation, but as that motion is continued, the position of Fig. 20 is assumed, in which both the brake and clutch are simultaneously operated. Further movement of the brake pedal causes the roller to wipe over the head 265 and to release the same and hence the clutch, but the brake continuing in operation. When the brake pedal is released, the several parts assume the position of Fig. 21. It will be obvious that this arrangement may be used with any of the clutch actuating mechanisms herein shown. It may be also noted, that when the brake pedal is actuated, the lost motion connection at 120 shown in Fig. 5 will prevent the accelerator from being operated.

It will now be seen that the invention is well adapted for operation in various ways, so that flexibility in a high degree is assured, as well as convenience and adaptability sufficient to comply with the most stringent modern requirements. In every case the engagement of the clutch is gradual and may be accomplished after the lapse of a suitable time interval. The engagement may be rendered effective due to the difference in speed of the driving and driven shafts, and of course, the speed of either of those shafts may be zero. Where the motor is accelerated, the rate of engagement of the clutch may be controlled according to the speed at which the motor is accelerated. In every case, the acceleration of the motor may be started after the engagement of the clutch has been initiated, and the engagement completed after acceleration to the desired degree has been effected to avoid any possibility of stalling of the motor. If the motor is connected as a brake, the clutch may remain positively locked so as to prevent the automobile from running ahead of the motor, whereby the automobile is at all times fully under control.

It may be also considered that according to this invention the inertia masses including the automobile or other vehicle or machine and associated parts and mechanism that are connected to the driven shaft operate to exert a retarding influence on the driven shaft, whereby the clutch actuating means are caused to function to close the clutch. The same principle may be stated in terms of the momentum or motion.

It will be appreciated that various changes and modifications may be made in the device as shown in the drawing, and that the same is submitted in an illustrative and not in a limiting sense, the scope of the invention being defined in the following claims.

I claim:

1. In combination with driving and driven shafts adapted to rotate at different varying speeds, and a clutch to interconnect the shafts to cause the same to rotate in a required speed relation, of releasable actuating means for the clutch including screw means rotated by one of the shafts, and coacting means turned by the other shaft, the coacting means having a thread having running engagement with the screw means, and the latter having relative movement with the coacting means due to said difference in shaft speeds to actuate the clutch, means tending automatically to reverse the direction of rotation of the screw means relative to the coacting means, and releasable locking means to retain the screw means and coacting means against said relative reverse movement.

2. A transmission including driving and driven shafts, engaging means to interconnect the shafts, said engaging means including a clutch, screw means rotated by one of the shafts, coacting means turned by the other shaft, the coacting means having a thread having running engagement with the screw means and the latter having relative axial movement with the coacting means due to the difference in shaft speeds to actuate the clutch, means tending to automatically cause the engaging means to disengage the shafts from each other, and other means to releasably lock said engaging means against disengagement.

3. A transmission including driving and driven shafts, engaging means to interconnect the shafts, said engaging means including a clutch, screw means rotated by one of the shafts, coacting means turned by the other shaft, the coacting means having a thread having running engagement with the screw means and the latter having relative axial movement with the coacting means due to the difference in shaft speeds to actuate the clutch, a spring tending to cause the engaging means to disengage the shafts from each other, pawl and ratchet wheel means tending to prevent reverse relative rotation of the screw means against the force of the spring, and means to release the pawl.

4. A transmission including a driving shaft, a driven shaft, a clutch for interconnecting the shafts, said clutch including a clutch element fixed to the driving shaft, a clutch element splined to the driven shaft, a sleeve on the driven shaft, engaging means journaled on the sleeve and having splined engagement with the first clutch element, said engaging means being adapted to actuate the second clutch element into engagement with the first clutch element, locking means to releasably lock the sleeve to the driven shaft, screw threaded means, said engaging means having running threaded connection with said screw threaded means, rotary means interconnecting the sleeve and said screw threaded means whereby the latter is rotated due to a difference in speed of said shafts to actuate the engaging means to close the clutch, and a spring tending to rotate the screw threaded means in reverse direction to open the clutch.

5. A transmission as set forth in claim 4, wherein said locking means includes a movable means slidable along the driven shaft, said movable means being rotatively resilient and being splined to the driven shaft, said movable means having pawl and ratchet wheel engagement with the engaging means to prevent reverse relative rotation thereof and opening of the clutch while the movable means is locked with the sleeve.

6. In combination with driving and driven shafts adapted to rotate at different varying speeds, and a clutch to interconnect the shafts to cause the same to rotate in a required speed relation, of releasable actuating means for the clutch including screw means rotated by one of the shafts, and coacting means turned by the other shaft, the coacting means having a thread having running engagement with the screw means, and the latter having relative movement with the coacting means due to said difference in shaft speeds to actuate the clutch, and a plurality of releasable pawl and ratchet wheel units operative in opposite directions, and actuating means for said units to cause one of them to function when the driving shaft rotates faster than the driven shaft, and the other when the driven shaft overruns the driving shaft to prevent opening of the clutch.

In testimony whereof I affix my signature.

HERMAN B. PHILIPS.